W. H. TOBEY.
Gate.
No. 230,087.    Patented July 13, 1880.
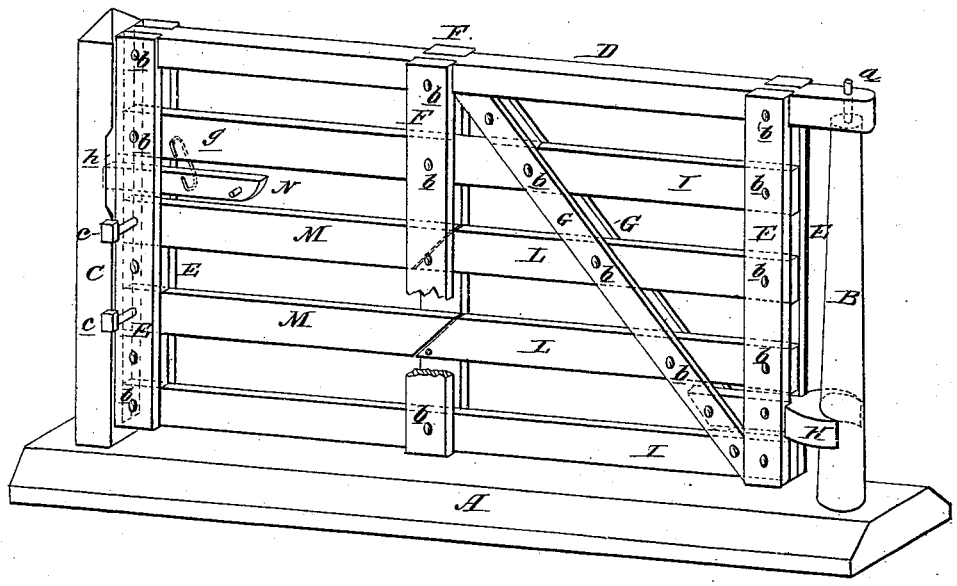
WITNESSES
INVENTOR:
W. H. Tobey
BY Munn & Co
ATTORNEYS.

UNITED STATES PATENT OFFICE.

WILLIAM H. TOBEY, OF LIVONIA, MISSOURI.

GATE.

SPECIFICATION forming part of Letters Patent No. 230,087, dated July 13, 1880.

Application filed December 31, 1879.

*To all whom it may concern:*

Be it known that I, WILLIAM H. TOBEY, of Livonia, in the county of Putnam and State of Missouri, have invented a new and Improved Gate, of which the following is a specification.

The drawing represents a perspective view of the gate.

The invention consists in a gate having one or more of its lower rails made in two parts, correspondingly beveled where they meet between the braces, and one of them secured at its unbeveled end by a detachable pin, as hereinafter described.

In the drawing, A represents the sill of the gate. B is a round tapering gate-post. C is the front post of the gate. D is the top supporting-rail of the gate, through whose rearward-projecting end the vertical pin $a$ passes and enters the top of the gate-post B, said pin $a$ serving as a support and pivot to the gate.

The ends of the gate are formed of the perpendicular double parallel braces E E, and midway between these braces and parallel with them is another pair of braces, F, that divide the gate into two panels.

A pair of diagonal braces, G, extend from the junction of the braces F with the top rail, D, down to the junction of the rear braces, E, with the bottom rail of the gate, and these diagonal braces prevent the gate from sagging. Extending rearward from between the bottom of these diagonal braces G, and between the rear upright brace, E, is a saddle, H, that bears against and partly encircles the lower part of the rear post, B.

The horizontal bars I of the gate are held by pins or bolts $b$ between the several pairs of upright and diagonal braces.

The half-bars L, having beveled front ends, are permanently pinned or bolted, as are the other bars I, the beveled ends of these half-bars L being secured between the central upright braces, F.

The movable half-bars M M have their forward ends secured by the movable pins $c$ between the front pair of upright braces E, while their rear beveled ends overlap and rest upon the beveled ends of the half-bars L, between the central upright braces, F, so that on the removal of the pins $c$ the said half-bars M can be pushed rearward to rest upon the half-bars L, and thus leave in the front panel of the gate a sufficient opening for the passing of small animals, such as hogs, sheep, &c., while the gate itself will prevent the passage of cattle. Hence by this arrangement smaller animals may be separated from the cattle in the field.

The gate-latch N is a horizontal bar suspended by parallel links $g$ from one of the permanent bars of the gate, so that its forward end may enter the vertical slot $h$ in the gate-post C.

This gate can be readily removed and set on a post elsewhere, and can be easily elevated clear of snow-drifts and other obstructions.

I am aware that it is not new in swinging gates to arrange short sliding bars in the lower part of the gate between one of the end uprights and a median slotted bar; but

What I claim is—

A gate having one or more of its lower rails made in two parts, L M, correspondingly beveled at their point of junction to fit one upon the other, and one of them held by a detachable pin, as shown and described.

WILLIAM HENRY TOBEY.

Witnesses:
 JOSEPH BONEBRIGHT,
 SARAH ANN RICE.